F. D. FOGARTY.
TRANSPORT FRAME SPECIALLY APPLICABLE TO HARVESTING MACHINES.
APPLICATION FILED APR. 7, 1917.

1,293,070.

Patented Feb. 4, 1919.
2 SHEETS—SHEET 1.

Francis Dennis Fogarty
Inventor
by Laurence Laurent
Attorney

F. D. FOGARTY.
TRANSPORT FRAME SPECIALLY APPLICABLE TO HARVESTING MACHINES.
APPLICATION FILED APR. 7, 1917.
1,293,070.
Patented Feb. 4, 1919.
2 SHEETS—SHEET 2.
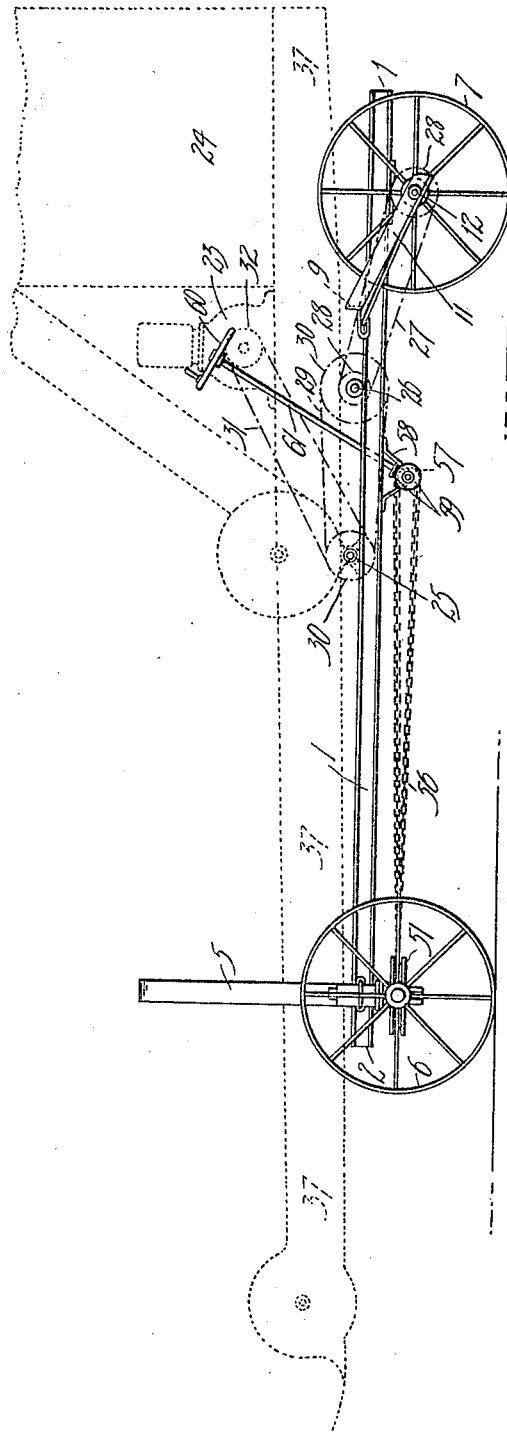
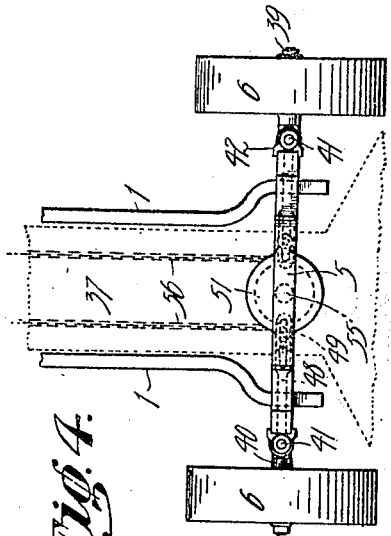
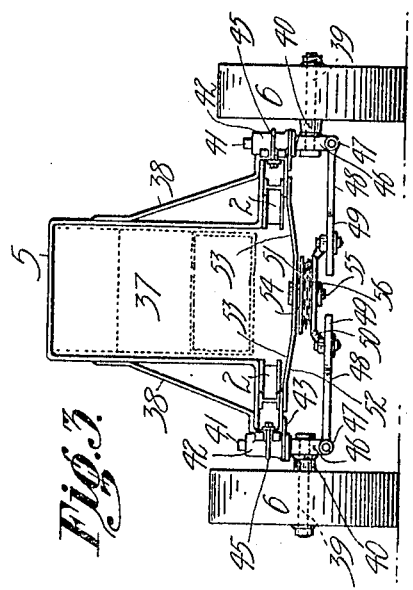
Francis Dennis Fogarty
Inventor
by Lawrence Langner
Attorney

UNITED STATES PATENT OFFICE.

FRANCIS DENNIS FOGARTY, OF PERTH, WESTERN AUSTRALIA, AUSTRALIA, ASSIGNOR TO THE "FOGARTY" PATENT INTERCHANGEABLE HARVESTER CORPORATION LIMITED, OF PERTH, WESTERN AUSTRALIA, AUSTRALIA.

TRANSPORT-FRAME SPECIALLY APPLICABLE TO HARVESTING-MACHINES.

1,293,070. Specification of Letters Patent. Patented Feb. 4, 1919.

Application filed April 7, 1917. Serial No. 160,581.

*To all whom it may concern:*

Be it known that I, FRANCIS DENNIS FOGARTY, a citizen of the Commonwealth of Australia, whose post-office address is 506 William street, Perth, Western Australia, Commonwealth of Australia, have invented certain new and useful Improved Transport-Frames Specially Applicable to Harvesting-Machines, of which the following is a specification, reference being had therein to the accompanying drawing.

This invention relates to an improved transport frame which is specially applicable to harvesting machines.

The invention has been devised in order to provide a harvester frame capable of being disconnected from the harvesting mechanism, thereby allowing the said frame to be used for other transport purposes. The improved frame embodies special means for driving and steering, and also means for driving the frame and mechanism carried thereby by animal power, animal and motive power combined, or by a power generator alone.

Hitherto horse drawn frames of the class specified, in order to allow of short curves to be taken, have been provided with a forecarriage pivoted to the frame, the front wheels being so mounted that they revolve freely on a fixed axle attached to a pivoted forecarriage. With a frame arranged in this manner, and when running on a curved road, the common axis of the front wheels will always intersect the axis of the two back wheels when both axes are produced, the point of intersection coinciding with the center from which the curve in the road is struck.

According to this invention, the pivoted forecarriage is dispensed with, the two front wheels being adapted to revolve loosely on different axles, pivoted in such a manner that they can be turned on a horizontal plane by the steering mechanism. In order that sharp curves may be taken it is necessary that the axis of both front wheels should intersect the axis of the rear wheels at the center of the curvature and according to this invention this condition is fulfilled by a system of short arms and chain gearing, the short arms being adapted to move simultaneously when the chain mechanism is operated, and the angles of the short arms are so arranged that when both wheels are constrained to move together by means of the steering mechanism, each will occupy a position tangential to its own path and the front wheels are thereby caused to swing around to take a curve.

Further essential features embodied in this invention consist—

1. In the method of fixing the front wheels to the main girders of the frame whereby the effect of shocks on the steering gear is reduced to a minimum.

2. In the particular arrangement of the rear axle in combination with clutches and springs, for imparting the drive from the wheel to the said axle.

3. The employment of fixed bars bolted to the main girders of the frame to connect the animal draft appliances.

4. Means whereby the frame may be interchanged from the harvesting mechanism and said mechanism replaced with other operative gear, such as chaff cutters or other machinery.

In order that the invention may be more readily understood it will now be described with reference to the accompanying drawings in which—

Fig. 2 is a view in side elevation, and

Fig. 3 is a view in front elevation of the improved frame as applied to a harvesting machine, while—

Fig. 4 is a view in plan illustrating more particularly the front wheels and the steering mechanism.

Figure 1:
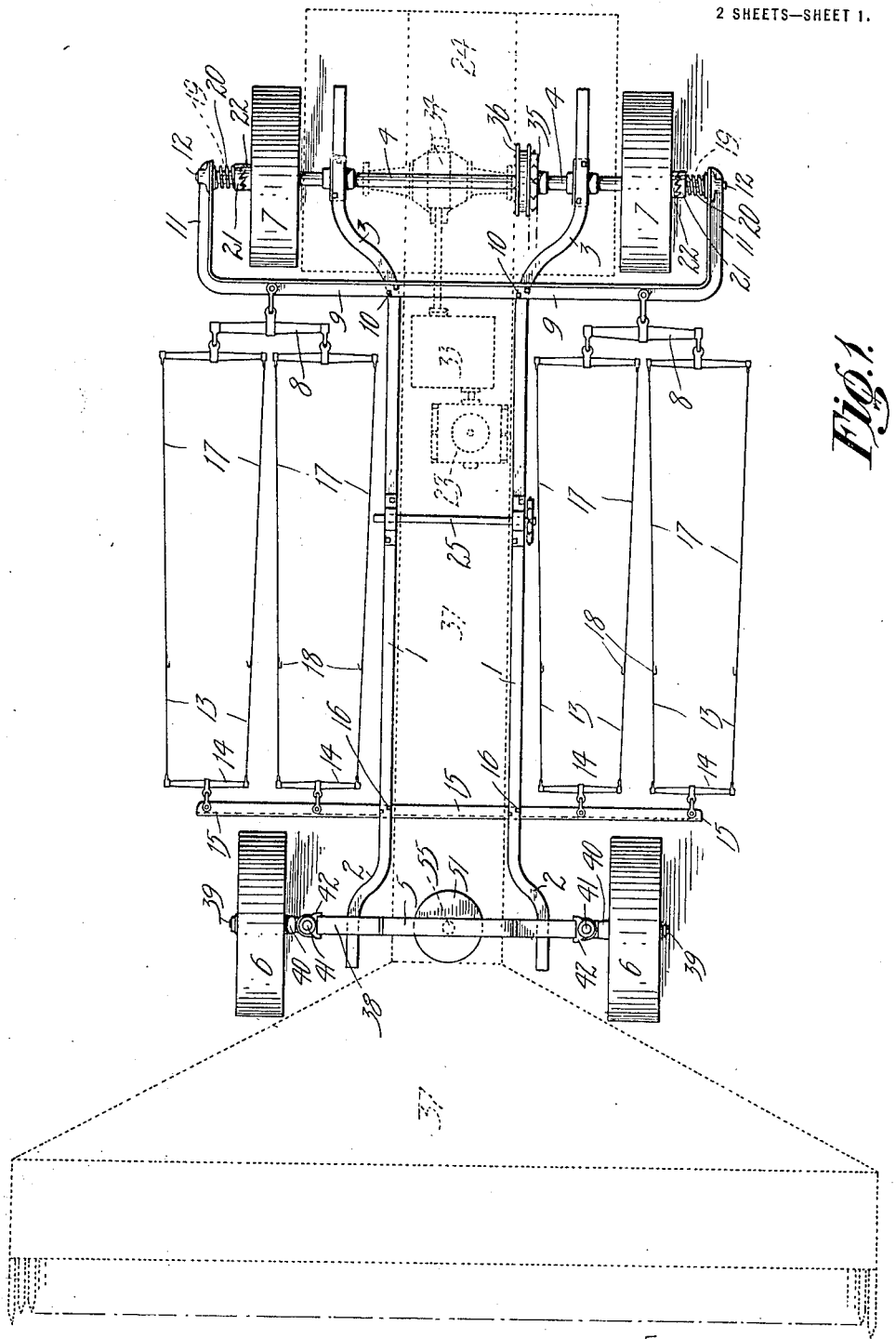
Figure 1 is a view in plan.

The frame consists of two main girders 1, spaced from each other in the manner illustrated, the front and rear ends 2, 3 respectively being bent outwardly to provide a substantially wide base or support for the rear axle 4 carrying the rear wheels 7 and the front frame 5 carrying the front steering wheels 6.

Horse draft appliances are preferably connected to the frame, being arranged between the rear wheels 7 and the front wheels 6 on either side of the main girders 1.

The swingletrees 8 attached to the usual double trees connect to a fixed rear draft bar 9 which is rigidly bolted at 10 to the frame, the ends being bent rearwardly at 11 and connect the bearings at the outer ends 12 of the rear axle 4.

In order to retain the animals in the direct line of travel, the chains 13 connect the forward swingletrees 14 fitted to the fixed transverse bar 15 bolted at 16 to the main girders 1 at the forward end of the main frame and immediately to the rear of the front wheels 6, the chains 13 being detachably connected to the harness 17 at 18.

The drive from the rear wheels 7 and the axle 4 is imparted through spring and clutch mechanism arranged outside each rear wheel 7. At the ends of the rear axle 4 is mounted a feather 19 and spring 20 which engage a clutch member 21 slidably arranged on the feather 19, and the axle 4 is brought into operation by means of the engagement of the clutch member 21 with a clutch member 22 mounted within the boss of each rear wheel 7. The parts are so arranged that on the forward movement of the rear wheels 7, the springs 20 mounted on the axle 4, force the movable clutch members 21 into engagement with the clutch members 22 in the respective bosses of the wheels 7, the axle 4 being thereby operated and driving motion directed to any part of the machine. This arrangement of drive is particularly applicable when animal draft only is used to supply motive power.

Alternatively, the drive may be distributed between the animal power for pulling the frame, and an auxiliary power generator 23, such as an internal combustion engine, may be employed to operate the harvesting mechanism or the power generator 23, which is mounted to the main frame immediately forwardly of the winnower or grain receptacle 24, may be arranged to drive, through the countershafts 25, 26, both the harvesting mechanism and the main frame, the latter receiving motion through the rear axle 4. When driving from the rear axle 4, motion is imparted to the shaft 26 by the chain 27 and sprocket gear 28, and from the shaft 26 to the fulcrum spindle or shaft 25 by the chain 29 and sprocket gear 30.

When driving from the power generator 23 as illustrated in Fig. 2 the drive is transmitted by the chain 31 and sprocket gear 32, as illustrated.

In the modification illustrated by dotted lines, Fig. 1, the power generator 23 may be arranged to drive the frame and harvester mechanism, the machine being propelled from a Cardan shaft, through a gear box 33 to a differential worm drive 34 fitted to the rear axle 4, it being obvious that the moving parts of the harvester mechanism would then be operated from a counter shaft by the sprocket or other wheel 35 carried by the clutch 36 on the rear axle 4 and controlled in such a manner that the gear may be thrown into or out of operation as desired.

The front wheels 6 as hereinbefore described are attached to the front 2 of the girders 1 of the main frame in a special and particular manner, no front axle being employed, so allowing the raising and lowering of a sub-frame 37 carrying the reaper mechanism which is preferably pivoted to the main frame at 25 within the front supporting frame 5.

This front supporting frame 5 is braced at 38 to the main frame 1 as illustrated in Fig. 3, and owing to the support given thereby and the pivoting of the reaper mechanism from the fulcrum spindle 25 the reaper mechanism can be raised or lowered to suit the crop, the fulcrum spindle being placed sufficiently to the rear of the front wheels to enable the combs to descend in an almost horizontal plane, and as there is no front axle, sufficient clearance is given the reaper mechanism to allow the combs to be lowered in a horizontal plane below the level of the stub axles 39 of the front wheels 6.

The front wheels 6 are mounted upon short stub axles 39, which terminate in a boss 40 carrying the vertical swivel pins or pivotal standards 41. The wheel hub is preferably provided with a ball race and a ball thrust to take up lateral friction in the ordinary way.

In order to minimize the effect of shocks upon the steering mechanism the swivel pins or standards 41 are placed as near as practicable to the center of the wheels 6.

The steering standards 41 are carried upwardly through a boss 42 and brackets 43 the latter being bolted at 45 to the supporting frame 5. At the lower extremity of the steering standard 41 a ball race may be provided to allow of easy turning or movement.

Immediately below the ball race the forked end 46 of each pivot standard 41 is provided with a boss 47 engaging a transverse arm 48 projecting toward the center of the frame. The arms 48 are slotted at 49 and are bolted to the lugs 50 of a horizontally disposed chain wheel 51.

A support 52 is bolted beneath girders 1 of the frame and is bent downwardly at 53, and horizontally at the center 54, to provide a rigid construction which enables the chain wheel 51 to be maintained in position by a king pin 55 bolted to the support 52. A chain 56 is arranged to pass around the chain wheel 51 and is then carried rearwardly to a position adjacent the driver's seat, around a chain wheel or drum 57 bracketed at 58 to the main frame 1, being operated through bevel gear 59, by the steering wheel 60 and steering pillar 61.

By removing the fulcrum spindle 25, the harvester mechanism carried by a support surrounding said spindle 25 can be detached from the frame which may then be used as a transport frame for a chaffcutter or other machinery or for any other analogous purpose.

In the operation of the frame and particularly when horse draft appliances are solely used, the drive is imparted to the rear axle 4 through the rear wheels 7, the forward movement of the rear wheels causing the springs 20 to force the clutch members 21 into engagement with the clutch members 22 mounted to the boss of each main wheel 7 so imparting a drive to the rear axle 4 which in turn imparts motion by means of counter shafts 25, 26 and driving gear to the moving parts of the harvester mechanism.

In steering the frame the steering wheel 60 is operated, and through the pillar 61 motion is imparted by means of the bevel gear 59 to the chain drum 57 which in turn operates the chain wheel 51 and longitudinal motion is imparted to the short stub axles 39 of the front wheels 6 so causing the front wheels to swing around to take the curve desired.

What I claim as my invention and desire to secure by Letters Patent, is—

1. A transport frame for harvesting machinery consisting in the combination of a main frame constructed of two spaced longitudinal girders carrying the axle of two main rear wheels and a front supporting frame for two front steering wheels, horse draft appliances between the front and rear wheels, the swingletrees being mounted upon a main draft bar fitted to the frame immediately in front of the rear wheels, the ends of the draft bar being bent rearwardly to connect the bearings of the outer ends of the rear axle, a front draft guide bar affixed to the frame immediately to the rear of the steering wheels, swingletrees carried by the front bar, means for driving the mechanism carried by the frame from the rear axle by horse draft, or by horse draft and a power generator, or by a power generator alone, means for mounting harvester reaper or other mechanism to a single pivot support, means for interchanging or removing the mechanism carried by the frame, and means for mounting the front wheels upon short stub axles and for operating the stub axles to cause the steering wheels to take any curve desired as and for the purposes specified.

2. The combination with a transport frame for harvesting machinery of a fixed draft bar arranged forwardly of the rear wheels, the ends of the draft bar being bent rearwardly and connected to the bearings at the ends of the rear axle, and a forward draft bar mounted to the frame immediately rearwardly of the front steering wheels and swingletrees connected to the draft bars, on either side of the main frame substantially as described.

In testimony whereof I affix my signature in the presence of two witnesses.

FRANCIS DENNIS FOGARTY.

Witnesses:
 HARRY HALE,
 W. P. MINCHIN.

Copies of this patent may be obtained for five cents each, by addressing the "Commissioner of Patents, Washington, D. C."